United States Patent
Dieter et al.

(10) Patent No.: US 8,950,290 B2
(45) Date of Patent: Feb. 10, 2015

(54) VEHICLE AND TRANSMISSION FOR A VEHICLE

(75) Inventors: Benjamin J. Dieter, Roseau, MN (US); Alan S. Olson, Roseau, MN (US); Daniel Scott Weber, Roseau, MN (US); William Burt Rodriguez, Roseau, MN (US); John D. Schreier, Lindstrom, MN (US); Stephen L. Nelson, Osceola, MN (US); Ron R. Danielson, Roseau, MN (US); Roy A. Sunsdahl, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 276 days.

(21) Appl. No.: 13/286,882

(22) Filed: Nov. 1, 2011

(65) Prior Publication Data
US 2012/0137828 A1 Jun. 7, 2012

Related U.S. Application Data

(60) Provisional application No. 61/408,926, filed on Nov. 1, 2010.

(51) Int. Cl.
*F16H 37/06* (2006.01)
*B60K 17/00* (2006.01)
*F16H 37/02* (2006.01)
*F16H 57/035* (2012.01)
*F16H 57/02* (2012.01)

(52) U.S. Cl.
CPC .............. *B60K 17/00* (2013.01); *F16H 37/021* (2013.01); *F16H 57/035* (2013.01); *F16H 37/027* (2013.01); *F16H 2057/02065* (2013.01)
USPC .................................. 74/665 GE; 74/665 GA

(58) Field of Classification Search
USPC .............. 180/252; 74/665 F, 665 G, 665 GA, 74/665 GE
See application file for complete search history.

(56) References Cited

U.S. PATENT DOCUMENTS

| 3,470,766 | A | * | 10/1969 | Magg et al. | ................. 74/665 T |
| 4,299,140 | A |   | 11/1981 | Kako et al. | |
| 4,344,335 | A | * | 8/1982  | Kawai | ........................... 475/223 |
| 4,392,394 | A | * | 7/1983  | Hofbauer et al. | ............. 475/204 |

(Continued)

FOREIGN PATENT DOCUMENTS

| EP | 1 950 459 A2 | 7/2008 |
| JP | S58136520 A | 8/1983 |
| WO | WO 2009/096975 A1 | 8/2009 |

OTHER PUBLICATIONS

International Search Report and Written Opinion issued by the European Patent Office, dated May 16, 2013, for International Application No. PCT/US2011/058810; 13 pages.

(Continued)

*Primary Examiner* — Ha D Ho
(74) *Attorney, Agent, or Firm* — Faegre Baker Daniels LLP

(57) ABSTRACT

A vehicle is described having a transmission driven through a propulsion unit such as an engine, and through a CVT. The transmission is comprised of an input shaft and an output shaft which are coaxially disposed. An idler shaft is driven by the input shaft, and the idler shaft drives the output shaft, through selected gear sets, to provide different gear ratios or drive directions. The CVT also has a fan on the driven side which feeds air through the CVT for cooling. The CVT comprises a drive side clutch and a driven side clutch with the output shaft of the extending through the CVT driven clutch.

23 Claims, 10 Drawing Sheets

(56) References Cited

U.S. PATENT DOCUMENTS

| | | | |
|---|---|---|---|
| 4,458,557 A | 7/1984 | Hayakawa | |
| 4,504,247 A * | 3/1985 | Chana et al. | 474/17 |
| 4,674,359 A | 6/1987 | Hattori | |
| 6,170,597 B1 | 1/2001 | Fukuda | |
| 2004/0224806 A1 | 11/2004 | Chonan | |
| 2005/0119076 A1 | 6/2005 | Chonan et al. | |
| 2005/0126842 A1 | 6/2005 | Rasidescu et al. | |
| 2006/0270503 A1 | 11/2006 | Suzuki et al. | |
| 2009/0050391 A1 | 2/2009 | Nobuhira | |

OTHER PUBLICATIONS

International Preliminary Report on Patentability issued by the International Bureau of WIPO, Geneva, Switzerland, dated Jun. 12, 2013, for International Application No. PCT/US2011/058810; 8 pages.

* cited by examiner

VEHICLE AND TRANSMISSION FOR A VEHICLE

BACKGROUND

The subject disclosure relates to a vehicle and more particularly to the drive arrangement for the vehicle.

Vehicles are known having propulsion units such as engines or motors which may be coupled to a transmission for driving the vehicle. The propulsion units may be generally aligned either in a longitudinal sense or a transverse sense relative to a longitudinal axis of the vehicle. A transmission is typically positioned longitudinally rearward of the propulsion unit and connected to one or more axles to drive the vehicle.

SUMMARY

Typically, the transmissions have two or more parallel shafts which engage with each other by way of gears or sprockets. The packaging of the transmission is therefore defined by the outer envelope of the shafts.

The vehicle as disclosed herein comprises at least one ground engaging member; a propulsion unit having an output; a transmission having an input shaft and an output shaft, the input and output shafts being coaxially arranged and coupled to each other; the propulsion unit output being coupled to the input shaft of the transmission; and the output shaft of the transmission being coupled to the at least one ground engaging member.

The transmission input shaft and output shaft may be aligned along a longitudinal axis. The transmission input shaft and output shaft may be positioned alongside the propulsion unit.

The propulsion unit output may be coupled to the input shaft of the transmission by way of a continuously variable transmission (CVT). The propulsion unit may be an engine or motor. The propulsion unit output may be an engine crankshaft.

The transmission output shaft may be positioned interiorly of the input shaft. The propulsion unit output may extend rearwardly.

The transmission may further comprise an idler shaft, wherein the input and output shafts are coupled to each other through the idler shaft. The transmission input shaft may be drivingly coupled to the idler shaft and the idler shaft may be drivingly coupled to the transmission input shaft.

The transmission input shaft and the idler shaft are interconnected by way of gears. The idler shaft may have plural sets of gears for accommodating possible output shaft drive speeds or rotational directions.

The vehicle may be a four wheeled drive vehicle and the output shaft of the transmission may extend forwardly and rearwardly from the input shaft of the transmission.

A transmission for the vehicle may comprise an input shaft, a coaxially disposed output shaft and an idler shaft, the input shaft driving the idler shaft, and the idler shaft driving the output shaft, through selected gear sets on the input shaft and idler shaft, to provide different gear ratios.

The transmission output shaft may extend through the input shaft.

A continuously variable transmission (CVT) according to the invention comprises a housing assembly having a drive side clutch and a driven side clutch. The driven side clutch has a fan, and the housing assembly includes an air inlet opening and an exhaust opening. The driven side fan feeds cool air in from the air inlet opening through the housing assembly and exhausts heated air through the exhaust opening.

The CVT driven side fans may be a centrifugal fan. The CVT centrifugal fan may be integrated with the sheave of the driven clutch. The CVT housing assembly may be comprised of a CVT housing and a CVT cover. The CVT air inlet opening may be positioned in the CVT cover and the exhaust opening may be positioned in the CVT housing.

BRIEF DESCRIPTION OF THE DRAWINGS

The embodiment will now be described by way of reference to the drawing figures, where.

DETAILED DESCRIPTION

Figure 1:
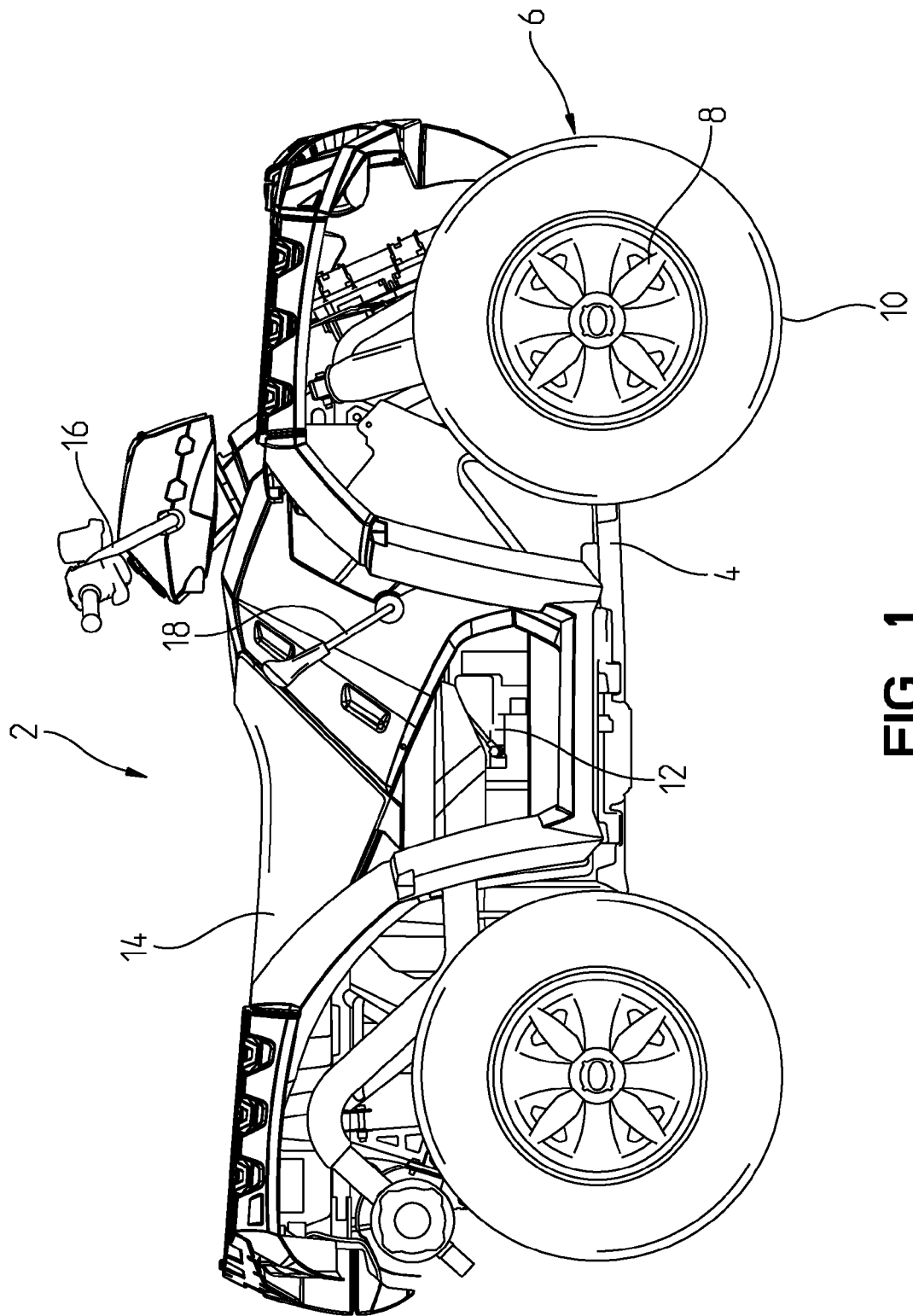
FIG. 1 is a representative view of a vehicle for which the drive train of the present disclosure may be utilized.

With reference first to FIG. 1, a representative vehicle is shown as an all terrain vehicle (ATV) 2 comprised of a frame 4 supported by ground engaging members 6. In this embodiment the ground engaging members are comprised of wheels 8 and tires 10, however it should be understood that any such ground engaging members are foreseeable such as skis or treads, track-type vehicles and the like. Vehicle 2 further comprises a power train 12 for propelling the vehicle, and further includes a seat 14 and steering mechanism 16 for steering the vehicle in a known manner. A shift mechanism 18 is provided for selecting various gear settings and/or direction of the vehicle power train 12.

Figure 2:
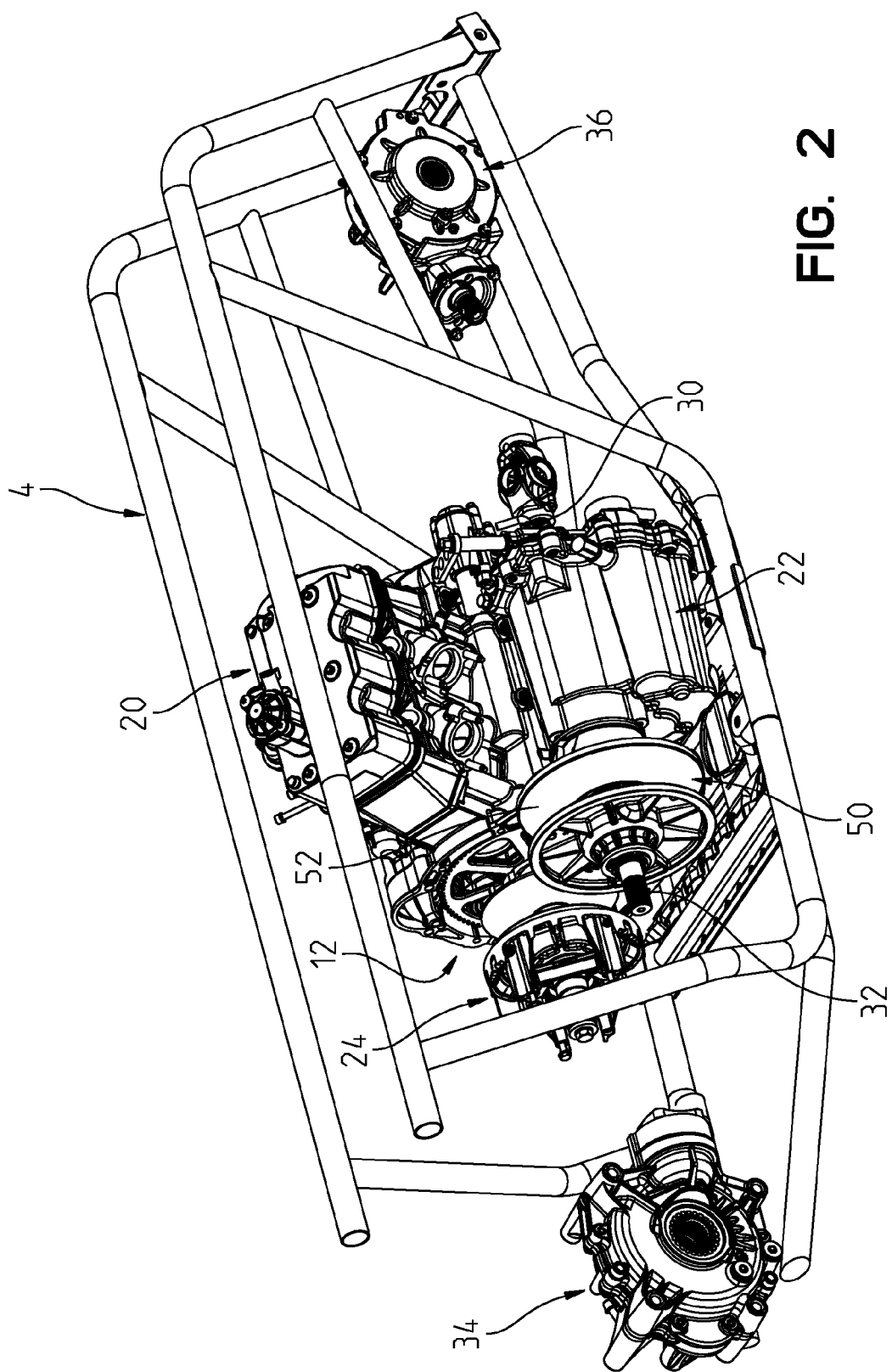
FIG. 2 is a rear perspective view of the power train of the present disclosure situated in the frame.

With reference now to FIG. 2, power train 12 is shown mounted in frame 4 where power train 12 is comprised of a propulsion unit 20, transmission 22, a continuously variable transmission (CVT) 24 (shown with CVT cover removed) coupling the engine 20 and the transmission 22. Front and rear stub shafts 30, 32 extend from the transmission to drivingly couple differentials such as 34 and 36 by way of drive shafts, as is known in the art. As shown, propulsion unit 20 is an internal combustion engine although it should be understood that the propulsion unit could be any type of unit, fuel burning, electric motor, etc. As shown, engine 20 is of the type shown and described in U.S. application Ser. No. 13/242,239 filed Sep. 23, 2011, the subject matter of which is incorporated herein by reference. It should also be appreciated from viewing FIG. 2 that the crankshaft of engine 20 is parallel to the longitudinal axis of the transmission 22. Furthermore, it should be appreciated that the engine and transmission are positioned side by side, in a parallel fashion, rather than serially, (end to end).

Figure 3:
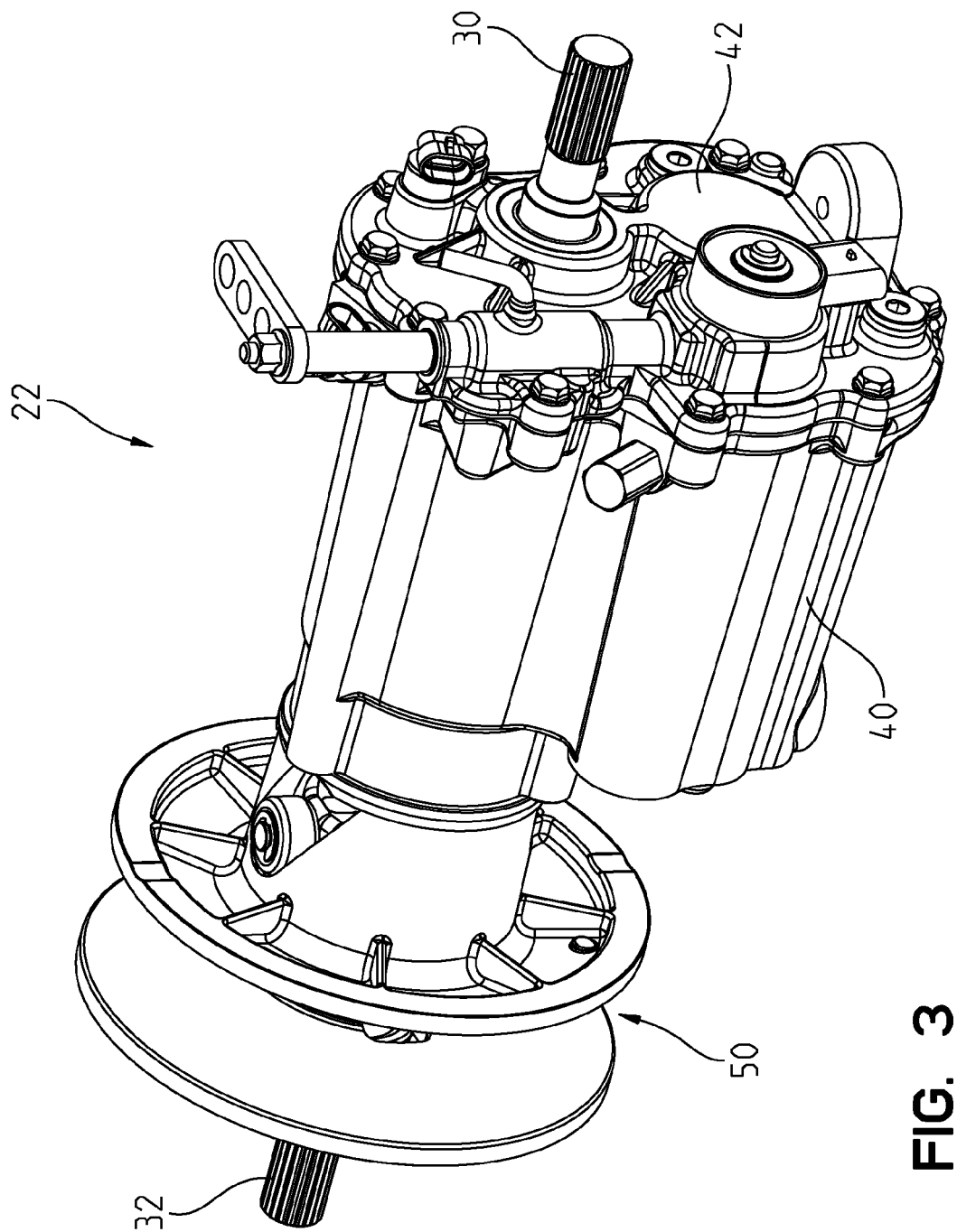
FIG. 3 is a front perspective view of the transmission of the present disclosure.
Figure 4:
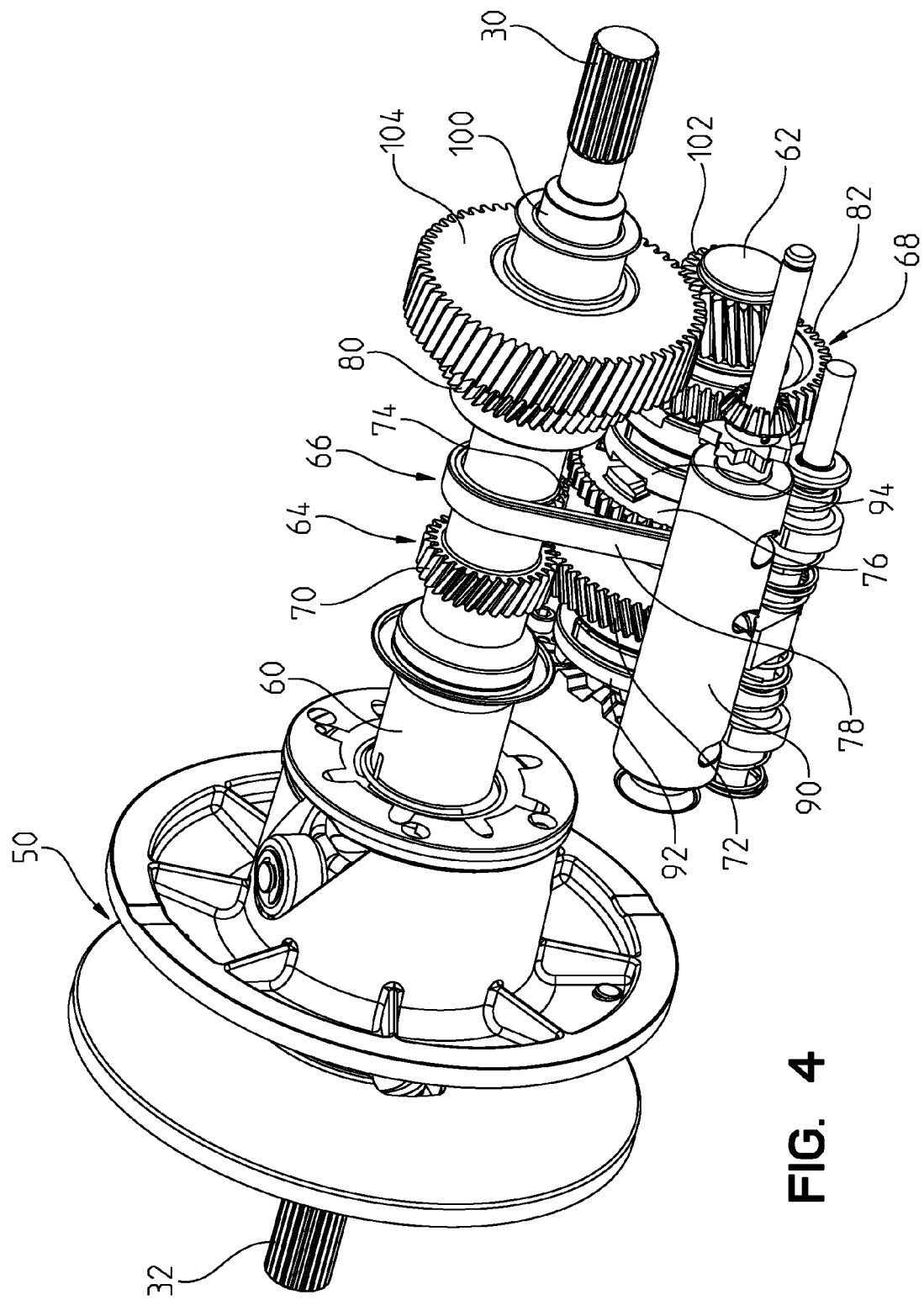
FIG. 4 is a view showing the internal gearing of the transmission of FIG. 3.

With reference now to FIGS. 3 and 4, transmission 22 is shown in greater detail. As shown in FIG. 3, transmission 22 includes transmission housing 40 having an end plate 42 through which stub shaft 30 extends. Stub shaft 32 extends through the opposite end of housing 40 and through a CVT driven sheave 50, as described herein. As shown in FIG. 4, sheave 50 is drivingly coupled to transmission input shaft 60 for driving input shaft 60 upon engagement of the engine through the CVT drive sheave 52 (See FIG. 2). With reference again to FIG. 4, an idler shaft 62 extends substantially parallel to input shaft 60, and is drivingly coupled to it as described below.

Multiple gear sets 64, 66 and 68 are included, coupling the input shaft 60 and idler shaft 62 to provide for speed and directional changes. For example, gear set 64 is comprised of a helical gear 70 on driveshaft 60 and a mating gear 72 on idler shaft 62. Gear set 66 is comprised of sprocket 74 and sprocket 76 entrained by way of chain 78. Gear set 68 is comprised of helical gear 80 and gear 82 on idler shaft 62. Shift mechanism 90 is provided which is movable in the longitudinal sense and is coupled to a plurality of clutches such as 92 and 94. Clutches 92 and 94 are splined to the idler shaft 62 and are movable longitudinally to engage the gears 72, 76 or 82 as described herein. With reference still to FIG. 4, an output shaft 100 is provided which extends concentrically and coaxially through input driveshaft 60 having stub shafts 30 and 32 at opposite ends. Thus sheave 50 drives input shaft 60, and input shaft 60 drives idler shaft 62. Idler shaft 62 drives output shaft 100 through a spur gear 102 on idler shaft 62 and spur gear 104 attached to output shaft 100.

Figure 5:
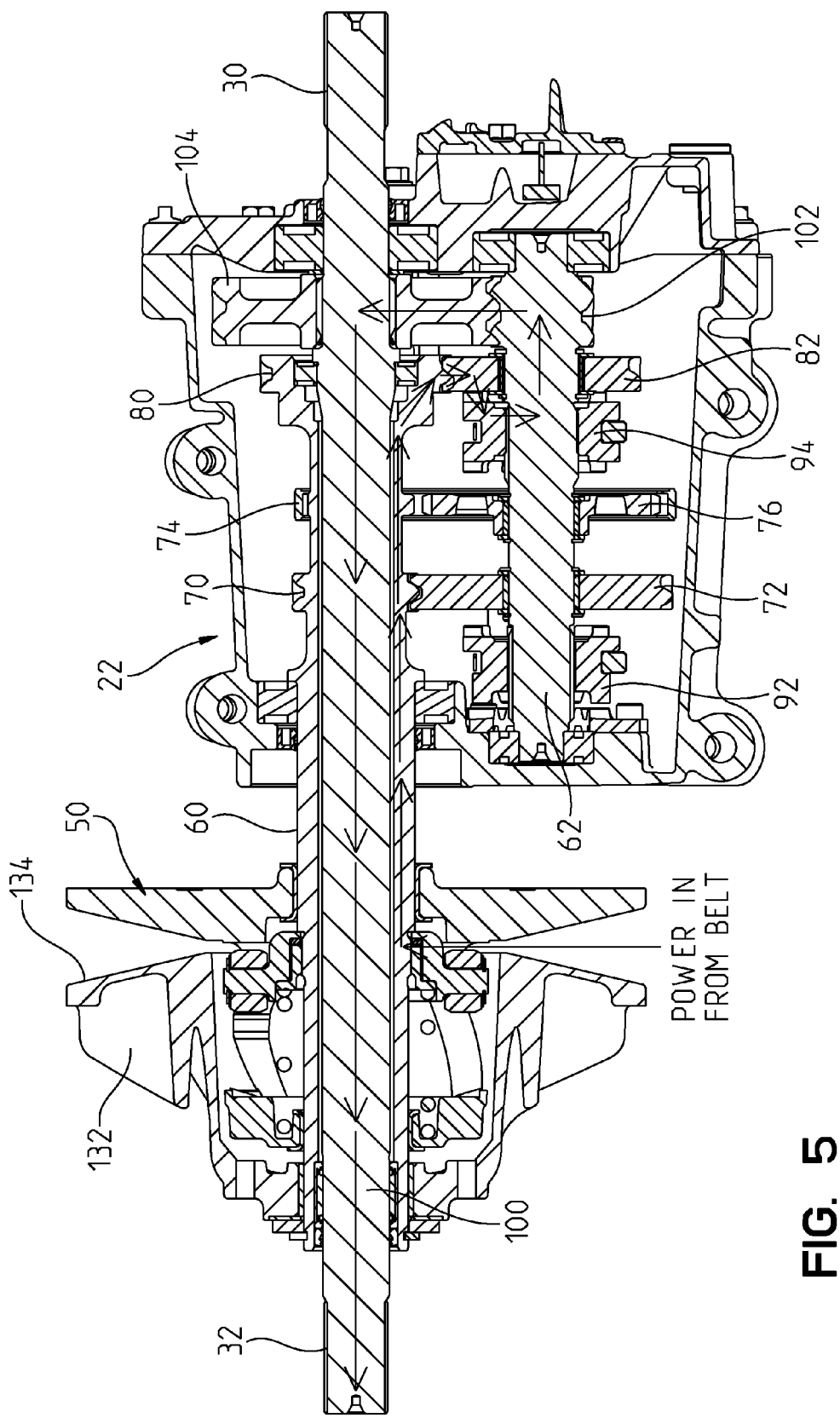
FIG. 5 is a power flowchart showing an exemplary the input and output to the transmission of the present disclosure.

With reference to FIGS. 4 and 5, the transmission will be described where input from CVT driven sheave 50 provides power to input shaft 60. It should be noted that driven sheave 50 is inverted to drive input shaft 60 forwardly alongside the engine 20 (as opposed to driving the input shaft rearwardly away from the engine). Gears 72, 82 and sprocket 76 are constantly driven by driveshaft 60, but freely spin relative to the idler shaft 62 through bearings. Clutches 92 and 94 are splined to idler shaft 62 but are movable longitudinally to move gear such as 82 into an engagement with its corresponding gear 80, and clutch 92 allows engagement between gears 70 and 72. When the clutches 92 and 94 engage gears 72, 82 and sprocket 76, the input shaft is coupled to the idler shaft 62, through only one gear set, 64, 66 or 68.

Figure 6:
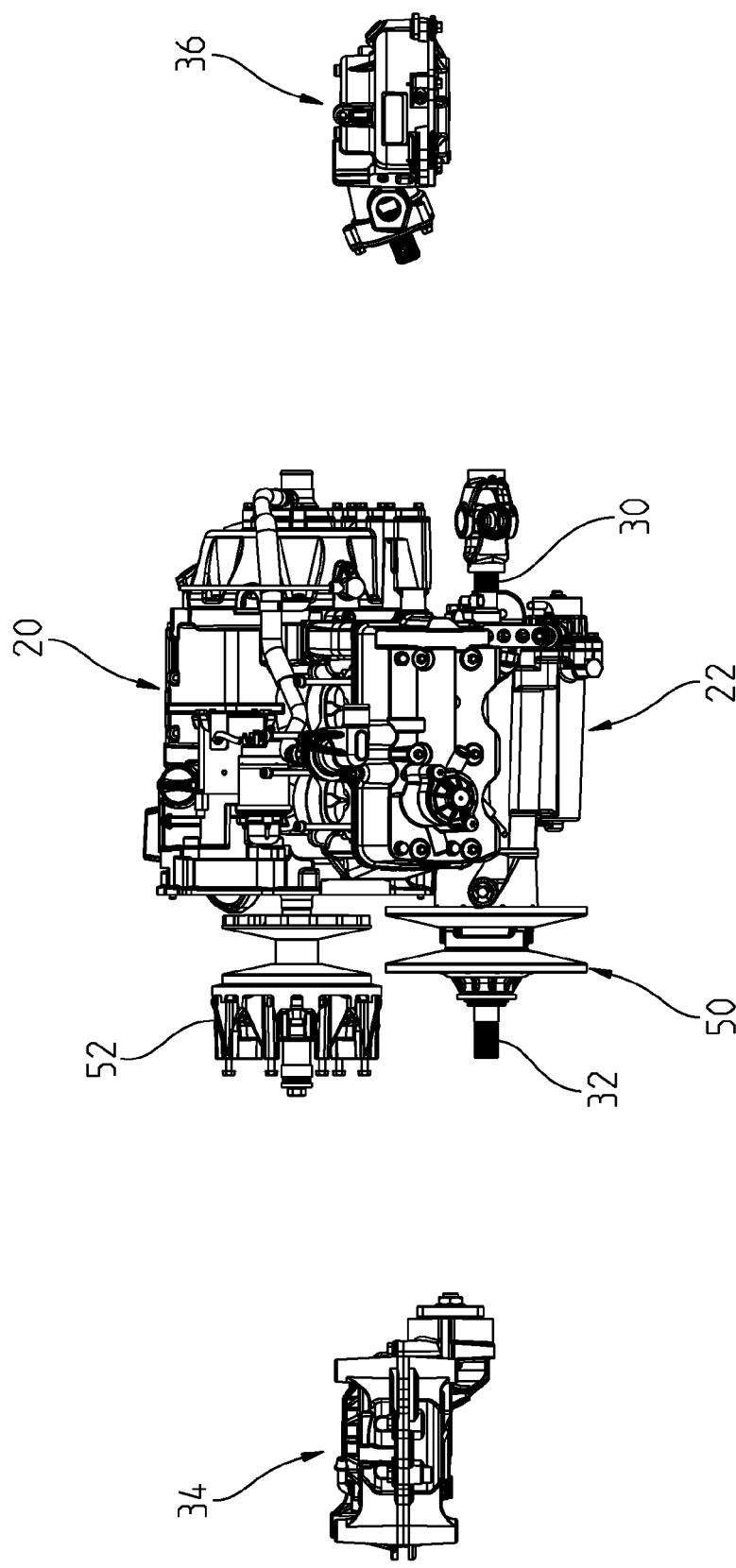
FIG. 6 is a top view of power train.

Thus and with reference to FIG. 5, an exemplary power distribution will be described where input from CVT driven sheave 50 provides power to input shaft 60. In this example, clutch 94 engages gear 82, which connects gear 82 to the idler shaft 62. Thus the power distribution is from sheave 50 to input shaft 60, to gear 80, through clutch to 94 to idler shaft 62, through gear 102 to gear 104, and then to output shaft 100. Both stub shafts 30, 32 are integral with output shaft 100. Idler shaft 62 thereafter drives output shaft 100 by way of gears 102, 104. As shown, output shaft 100 is concentric to input shaft 60 with stub shafts 30 and 32 positioned for connection to the differentials 34, 36 as shown in FIG. 6 and as described below.

Alternatively, and still with reference to FIG. 5, power distribution utilizing sprockets 74, 76 would include input from sheave 50 to input shaft 60 through sprockets 74, 76. In this instance, clutch 94 would be moved leftwardly from the position shown in FIG. 5 to engage sprocket 76 therefore connecting sprocket 76 to idler shaft 62 again engaging gears 102, 104 to drive output shaft 100. Finally, a power distribution utilizing gears 70, 72 would include input from sheave 50 to input shaft 60 thereby driving gears 70 and 72. In this instance, clutch 94 would be moved to an intermediate position and disengaged position between sprocket 76 and gear 82, however clutch 92 would be moved rightwardly from its position shown in FIG. 5 to engage gear 72. The engagement between clutch 92 and gear 72 engages idler shaft 62 where upon the power distribution would flow through gears 102, 104 through output shaft 100.

As described, transmission 22 has provided a lighter and smaller envelope transmission due to the elimination of one offset centerline for the driven shaft 62. Transmission 22 also provides less imbalance forces as the input 60 and output 100 shafts run concentrically to each other. Moreover, transmission 22 allows the output shaft 30, 32 to be more in line with the corresponding differentials 36, 34, requiring a lesser offset angle for the universal joints and prop shafts, providing a more efficient drive train and less wear. The design also provides for a cooler running CVT as described below.

Figure 7:
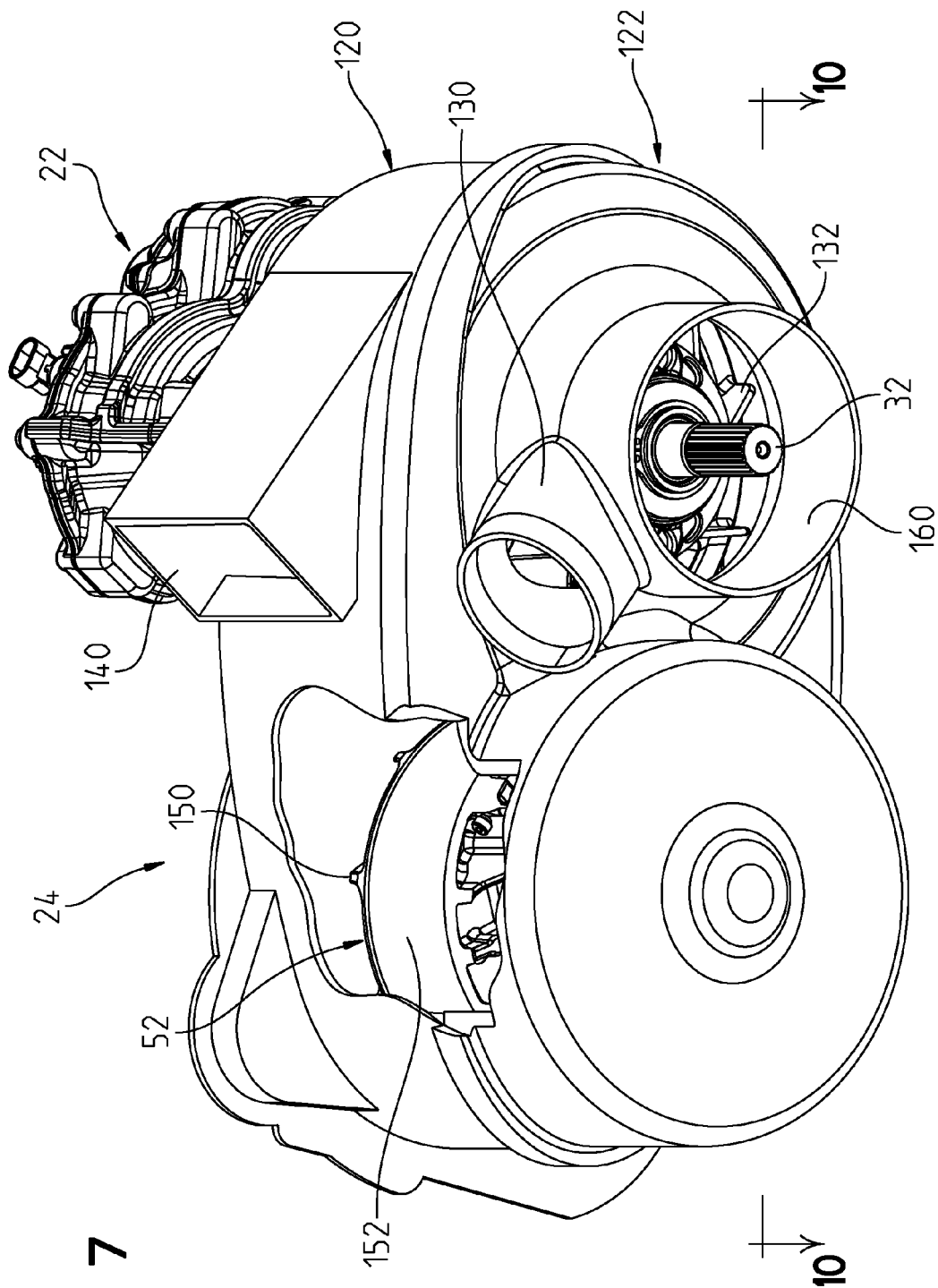
FIG. 7 is a rear perspective view of the power train of the present disclosure.
Figure 8:
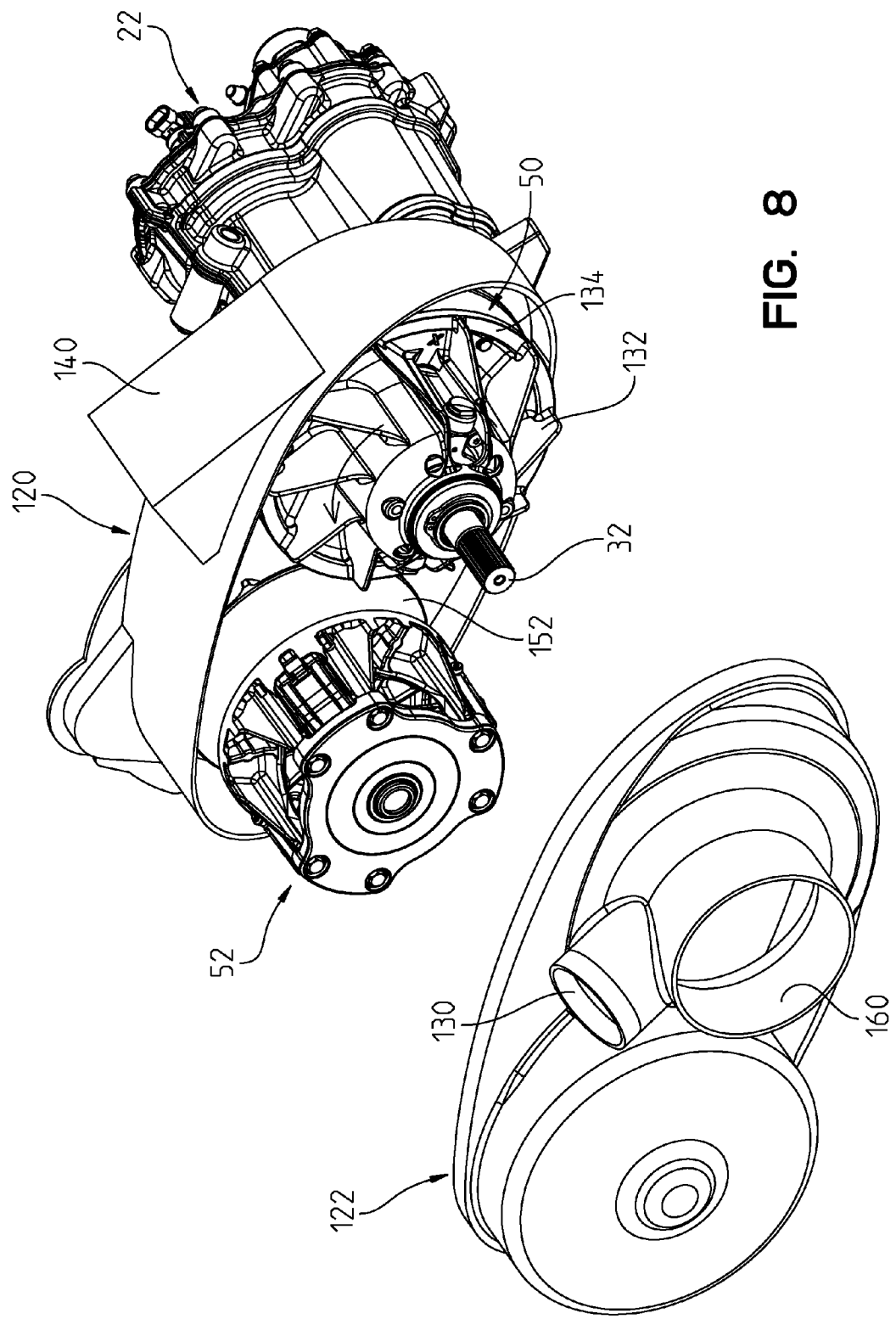
FIG. 8 is a view similar to that of FIG. 7 showing the CVT cover exploded away from the CVT.
Figure 9:
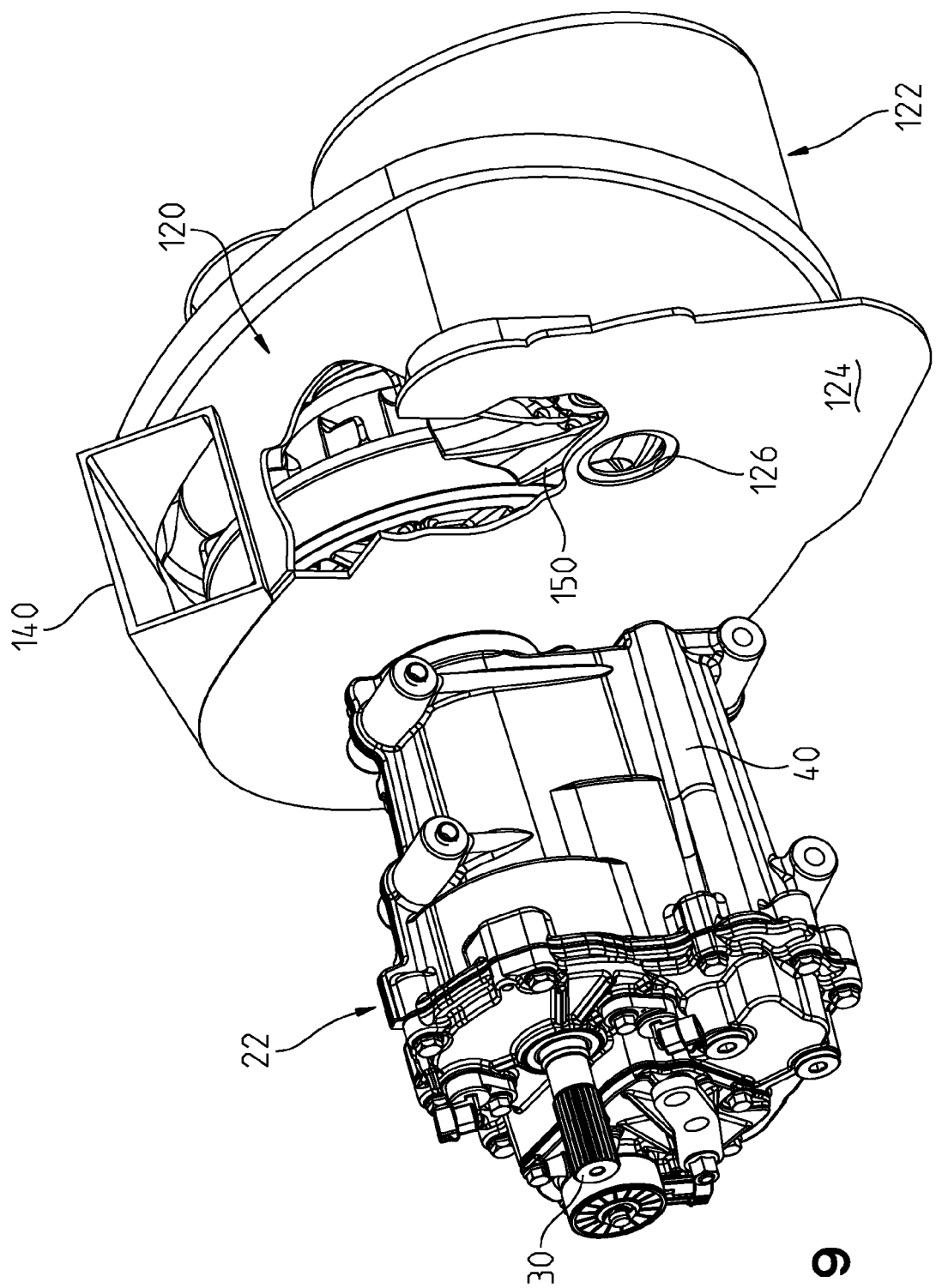
FIG. 9 is a rear perspective view of the CVT with the CVT housing partially cut away.

With reference now to FIGS. 7-10 the CVT 24 will be described in greater detail. As shown in FIG. 7, the CVT 24 has a housing assembly comprised of a CVT housing 120 and a CVT cover 122, which covers the drive clutch 52 and the driven clutch 50 (FIG. 8). As noted from FIG. 9, the CVT housing 120 includes a rear wall 124 which may be directly connected to the crankcase of engine 20 (on the drive side) and to the transmission 22 (on the driven side). Rear wall 124 includes an opening 126 for receiving the crankshaft therethrough for connection to the drive clutch 52, and a circular coupler 128 (FIG. 10) extending from wall 124 which may be directly connected to transmission housing 40.

With reference now to FIGS. 7 and 8, the clutch cover 122 includes an air inlet opening 130 and driven clutch 50 includes a centrifugal fan blade 132 integrated with the CVT sheave 134. Meanwhile CVT housing 120 includes an air exhaust opening 140, which exhausts the air from the CVT housing/cover. Thus when CVT driven sheave 134 is driven in the direction of the arrow in FIG. 8, centrifugal fan 132 draws air into air inlet opening 130 and air is exhausted through air exhaust opening 140. Air flows from front to back (as viewed in FIGS. 7 and 8) and air is exhausted through air exhaust opening 140. An impeller blade 150 (FIG. 9) may be integrally formed on the rear side of drive sheave 152, to assist in the air flow through the CVT housing and cover 120, 122.

CVT cover also includes a drive opening 160 which provides an access point for the stub shaft 32. Drive opening 160 could include a sealed boot (not shown) to a drive shaft as is known in the art.

Figure 10:
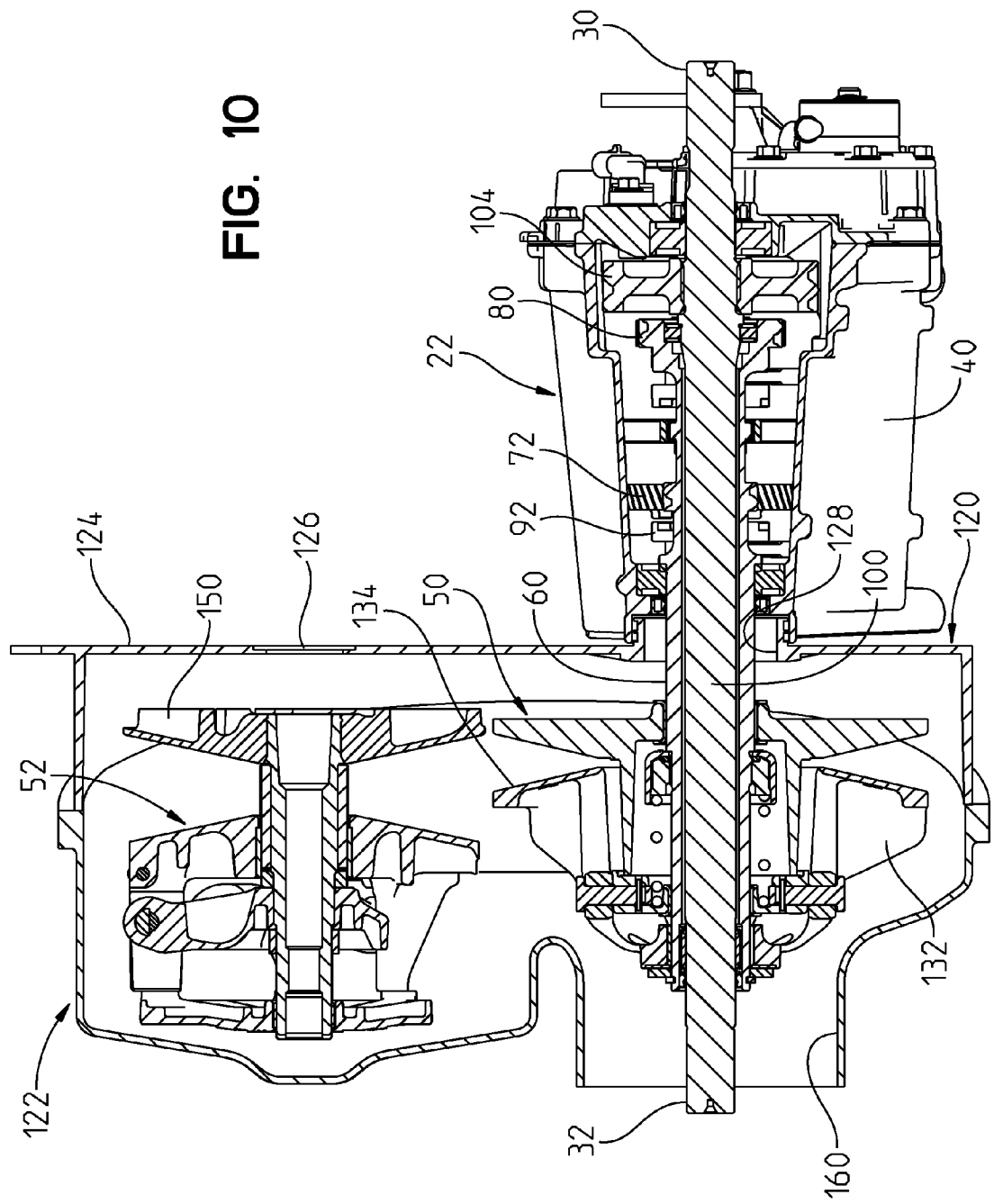
FIG. 10 is a cross sectional view through lines 10-10 of FIG. 7.

Thus as shown in FIG. 10, transmission 22 may be directly coupled with the CVT housing 120, overlapping the coupling 128. Seals such as O-rings could be used to seal the connection joint. Driven CVT 50 is directly coupled to input shaft 60 and output shaft 100 extends coaxially of input shaft 60, with stub shaft 32 extending though driven CVT 50. Stub shaft 30 extends though the opposite end of transmission 22. Meanwhile, the CVT further includes a clutch housing 120 and a clutch cover 122 and the stub shaft 32 extends though opening 160 for connection to differential 34 (FIG. 2).

What is claimed is:
1. A vehicle, comprising:
at least one ground engaging member;
a propulsion unit having an output;
a transmission having a housing, an input shaft, an idler shaft and an output shaft, the input and output shafts being coaxially arranged and coupled to each other, the idler shaft being parallel to the input and output shafts, the input and idler shafts having plural gear sets for alternative gear ratio couplings between the input shaft and idler shaft;

a continuously variable transmission (CVT) coupling the input shaft of the transmission to the propulsion unit output, the CVT including an input sheave coupled to the input shaft, and the output shaft extends through the input shaft and the input sheave; and the output shaft of the transmission extending through the transmission housing and being coupled to the at least one ground engaging member.

2. The vehicle of claim 1, wherein the transmission input shaft and output shaft are aligned along a longitudinal axis.

3. The vehicle of claim 2, wherein the transmission input shaft and output shaft are positioned alongside the propulsion unit.

4. The vehicle of claim 2, wherein the transmission input shaft and output shaft are positioned parallel to a longitudinal axis of the propulsion unit.

5. The vehicle of claim 1, wherein the propulsion unit is a combustion engine or motor.

6. The vehicle of claim 5, wherein the propulsion unit is a combustion engine having a crankshaft and the transmission input and output shafts are parallel to an axis of the crankshaft.

7. The vehicle of claim 1, wherein the propulsion unit output extends rearwardly.

8. The vehicle of claim 1, wherein the transmission input shaft is drivingly coupled to the idler shaft and the idler shaft is drivingly coupled to the transmission output shaft.

9. The vehicle of claim 8, wherein the plural sets of gears accommodate possible output shaft drive speeds or rotational directions.

10. The vehicle of claim 9, further comprising one or more clutches for accommodating the possible drive speeds or vehicle direction.

11. The vehicle of claim 1, wherein the vehicle is a four wheeled drive vehicle and the output shaft of the transmission extends forwardly and rearwardly from the input shaft of the transmission.

12. A vehicle of claim 1, further comprising a CVT having a drive side clutch and a driven side clutch, the driven side clutch being coupled to the input shaft.

13. The vehicle of claim 12, wherein the driven side clutch has a fan, and the housing assembly includes an air inlet opening and an exhaust opening, the driven side fan feeding air in from the air inlet opening through the housing assembly and exhausting through the exhaust opening.

14. The vehicle of claim 13, wherein the driven side fan is a centrifugal fan.

15. The vehicle of claim 13, wherein the housing assembly is comprised of a CVT housing and a CVT cover.

16. The vehicle of claim 14, wherein the centrifugal fan is integrated with the sheave of the driven clutch.

17. The vehicle of claim 13, wherein the air inlet opening is positioned in the CVT cover and the exhaust opening is positioned in the CVT housing.

18. The vehicle of claim 1, wherein the input shaft overlaps the output shaft over a first distance and the output shaft has a second distance where it is not overlapped by the input shaft.

19. The vehicle of claim 18, wherein the plural gear sets are positioned on the input shaft and the idler shaft in the first distance.

20. The vehicle of claim 19, wherein idler shaft is coupled to the output shaft in the second distance.

21. The vehicle of claim 20, wherein the output shaft extends through the housing at a first end and through the housing at a second end.

22. The vehicle of claim 21, wherein the output shaft extends through the housing at a front end and is coupled to at least one front ground engaging member.

23. The vehicle of claim 21, wherein the output shaft extends through the housing at a rear end and is coupled to at least one rear ground engaging member.

* * * * *